United States Patent

Witschard

[15] 3,650,807

[45] Mar. 21, 1972

[54] SUBSTRATE HAVING METAL PHOSPHORUS OR METAL PHOSPHORUS SULFUR COMPOUND ON SURFACE AND CURED SICCATINE COATING COMPOSITION THEREON

[72] Inventor: Gilbert Witschard, Grand Island, N.Y.

[73] Assignee: Hooker Chemical Corporation, Niagara Falls, N.Y.

[22] Filed: Sept. 30, 1970

[21] Appl. No.: 76,999

Related U.S. Application Data

[63] Continuation-in-part of Ser. No. 722,543, Apr. 19, 1968, abandoned.

[52] U.S. Cl.................................117/69, 117/72, 117/76 F, 117/87, 117/138.8 E, 117/138.8 UA R, 117/169 R, 117/201
[51] Int. Cl. ......................................B32b 27/06, B44d 1/14
[58] Field of Search....................117/69, 87, 72, 76 P, 76 F, 117/76 T, 47 R, 47 A, 138.8 E, 138.8 UA; 204/30; 161/191

[56] References Cited

UNITED STATES PATENTS 2,067,216   1/1937   Thompson et al. ......................117/69

OTHER PUBLICATIONS

Langbein et al., Electrodeposition of Metals, 9th ed., Baird & Co., 1924, pp. 766– 769
Bayard, Electrodeposition on Plastic Materials, Metal Industry, May 1940, pp. 255– 259

*Primary Examiner*—William D. Martin
*Assistant Examiner*—Ralph Husack
*Attorney*—Peter F. Casella, Donald C. Studley, Richard P. Mueller and James F. Mudd

[57] ABSTRACT

A siccative coating composition such as paint, lacquer, varnish, enamel and the like, is applied to an article having a metal phosphorus and/or metal phosphorus sulfur compound adherently formed at the surface of a substrate, wherein said metal is selected from groups 1B, 11B, IVB, VB, VIB, VIIB and VIII of the Periodic Table.

15 Claims, No Drawings

SUBSTRATE HAVING METAL PHOSPHORUS OR METAL PHOSPHORUS SULFUR COMPOUND ON SURFACE AND CURED SICCATINE COATING COMPOSITION THEREON

REFERENCE TO PRIOR APPLICATION

This is a continuation-in-part of copending application, Ser. No. 722,543 filed Apr. 19, 1968 now abandoned.

BACKGROUND OF THE INVENTION

There is a rapidly increasing demand for articles such as plastics and other materials, that have adherent decorative and protective coatings. Such articles are in demand in such industries as automotive, home appliance, radio and television and for use in decorative containers and the like. Heretofor, obtaining good adhesion between coating compositions such as paints, lacquers varnishes, enamels and the like, and the substrate, especially plastics, has been a problem.

It is another object of this invention to provide a process for applying a siccative coating composition to an article having a metal phosphorus and/or metal-phosphorus-sulfur compound adherently formed at the surface of a substrate. It is another object of the invention to provide a process for adherently applying a protective or decorative coating to a metal phosphorus and/or metal-phosphorus-sulfur compound adherently formed at the surface of a substrate. A further object is to provide articles having a metal phosphorus and/or metal phosphorus-sulfur adherently formed on the surface of a substrate and having a protective or decorative coating thereon. Other objects will be apparent to those skilled in the art from the following detailed description.

SUMMARY OF THE INVENTION

This invention relates to a process for applying a siccative coating composition to a metal coated substrate and to the product thereof. More particularly, the invention relates to a process for applying a siccative coating composition to an article having a metal phosphorus and/or metal-phosphorus-sulfur compound adherently formed at the surface of a substrate, wherein said metal is selected from groups 1B, 11B, IVB, VB, VIB, and VIII of the Periodic Table.

DESCRIPTION OF THE PREFERRED EMBODIMENT

An article having a metal phosphide adherently formed at the surface of the substrate is provided in accordance with the process of copending application Ser. No. 683,739 filed Nov. 17, 1967, now abandoned. An article having a metal-phosphorus-sulfur compound adherently formed at the surface of the substrate is provided in accordance with the process of copending application Ser. No. 23,967 filed Mar. 30, 1070 which is a continuation-in-part of Ser. No. 855,037 filed Sept. 3, 1969. These processes are applicable to substates, such as plastics and to other substantially nonmetallic substrates. Suitable substrates include, but are not limited to, cellulosic and ceramic materials such as cloth, paper, wood, cork, cardboard, clay, porcelain, leather, porous glass, asbestos, cement, and the like.

Typical plastics to which the process of this invention is applicable include the homopolymers and copolymers of ethylenically unsaturated aliphatic, alicyclic and aromatic hydrocarbons such as polyethylene, polypropylene, polybutene, ethylenepropylene copolymers; copolymers of ethylene or propylene or with other olefins, polybutadiene; polymers of butadiene, polyisoprene, both natural and synthetic, polystyrene including high impact polystyrene and polymers of pentene, hexene, heptene, octene, 2-methylpropene, 4-methyl-hexene-1, bicyclo-(2.2.1)-2-heptene, pentadiene, hexadiene, 2,3-dimethylbutadiene-1,3,4-vinylcyclohexane, cyclopentadiene, methylstyrene, and the like. Other polymers useful in the invention include polyhalogenated hydrocarbon polymers, including fluoro polymers such as polytetrafluoroethylene; polysilicone and polyhalogenated silicones; polyindene, indenecoumarone resins; polymers or acrylate esters and polymers of methacrylate esters, acrylate and methacrylate resins such as ethyl acrylate, n-butyl methacrylate, isobutyl methacrylate, ethyl methacrylate and methyl methacrylate; alkyd resins; cellulose derivatives such as cellulose acetate, cellulose acetate butyrate, cellulose nitrate, ethyl cellulose, hydroxyethyl cellulose, methyl cellulose and sodium carboxymethyl cellulose; epoxy**resins; furan resins (furfuryl alcohol or furfural ketone); hydrocarbon resins from petroleum; isobutylene resins (polyisobutylene); isocyanate resins (polyurethanes); melamine resins such as melamine-formaldehyde and melamine-urea-formaldehyde; oleo-resins; phenolic resins such as phenol-formaldehyde, phenolic-elastomer, phenolic-epoxy, phenolic-polyamide, and phenolic-vinyl acetals; polyamide polymers, such as polyamides, polyamide-epoxy and particularly long chain synthetic polymeric amides containing recurring carbonamide groups as an integral part of the main polymer chain; polyacryl amides; polysulfones; polyester resins such as unsaturated polyesters of dibasic acids and dihydroxy compounds, and polyester elastomer and resorcinol resins such as resorcinol-formaldehyde, resorcinol-furfural, resorcinol-phenol-formaldehyde, resorcinol-polyamide and resorcinol-urea; rubbers such as natural rubber, synthetic polyisoprene, reclaimed rubber, chlorinated rubber, polybutadiene, cyclized rubber, butadiene-acrylonitrile rubber, butadiene-styrene rubber, and butyl rubber; neoprene rubber (polychloroprene); polysulfides (Thiokol); terpene resins; urea resins; vinyl resins such as polymers of vinyl acetal, vinyl acetate or vinyl alcohol-acetate copolymer, vinyl alcohol, vinyl chloride, vinyl butyral, vinyl chloride-acetate copolymer, vinyl pyrrolidone and vinylidene chloride copolymer, such as a copolymer of vinylidene chloride and vinyl chloride (Saran); polyformaldehyde; polyethers, such as polyphenylene oxide, polymers of diallyl phthalates and phthalates; polycarbonates of phosgene or thiophosgene and dihydroxy compounds such as bisphenols, thermoplastic polymers of bisphenols and epichlorohydrin (tradenamed Phenoxy polymers); graft copolymers and polymers of unsaturated hydrocarbons and an unsaturated monomer, such as graft copolymers or polybutadiene, styrene and acrylonitrile, commonly called ABS resins; ABS-polyvinyl chloride polymers; acrylic polyvinyl chloride polymers; and any other suitable natural and synthetic polymers..

The polymers of the invention can be used in the unfilled conditions, or with fillers such as glass fiber, glass powder, glass beads, asbestos, talc and other mineral fillers, wood flour and other vegetable fillers, carbon in its various forms, dyes, pigments, waxes and the like.

In the process of this invention, the substrate is subjected to a member of the group of elemental white phosphorus and low oxidation state phosphorus compounds, and thereafter to a metal salt or complex thereof. This process is described in copending applications, Ser. No. 614,541, filed Feb. 8, 1967; Ser No. 750,488, filed Aug. 6, 1968; Ser. No. 750,477, filed Aug. 6, 1968; Ser. No. 855,037, filed Sept. 3, 1969; Ser. No. 847,423, filed Aug. 4, 1969, and in Ser. No. 23,967, filed Mar. 30, 1970, which disclosures are hereby incorporated by reference.

The subjection to elemental white phosphorus, which includes the various impure or commercial grades sometimes referred to as yellow phosphorus, can be effected when the phosphorus is in the vapor phase, is a liquid, or is dissolved in a solvent. Suitable solvents or diluents for the elemental phosphorus are solvents which dissolve elemental phosphorus and which preferably swell the surface of a plastic without detrimentally affecting the surface of the plastic. Such solvents include the halogenated hydrocarbons and halocarbons such as chloroform, methylchloroform, dichloroethylene, trichloroethylene, perchloroethylene, and the like; aromatic hydrocarbons such as benzene, toluene, xylene, and the like. The solution concentration is generally in the range from about 0.0001 weight percent of phosphorus based on the weight of the solution up to a saturated solution, and preferably from about 0.1 to about 2.5 percent. Generally the temperature is in the range of about 30° to 135° centigrade, but preferably in the range of about 50° to 100° centigrade. The contact time varies depending on the nature of the substrate, the solvent and temperature, but is generally in the range of about 1 second to 1 hour or more, preferably in the range of about 1 to 10 minutes.

Alternatively, the substrate can be subjected to at least one low oxidation state phosphorus compound, i.e., wherein the phosphorus has a valence of less than 5, preferably in a solvent. Suitable low oxidation state compounds are trihydroxymethyl phosphine; phosphorus sesquisulfide; $P_4H_2$; phosphine; diphosphine, hypophosphorus acid and salts thereof of the metals of Groups I, II and III; phosphorus acid and the salts thereof of the metals of Groups I, II and III, and low oxidation state phosphorus compounds prepared by reacting elemental phosphorus with a suitable nucleophilic reagent or organo metallic compound (including Grignard reagents). Suitable nucleophilic reagents include basic compounds having an unshared pair of electrons on a carbon, oxygen, nitrogen, sulfur or phosphorus atom. The preferred nucleophilic reagents have the formula MZ wherein M is an alkali metal or alkaline earth metal and Z is hydroxide, alkoxide, amide, sulfite, thiosulfate, mercaptide, cyanate, thiocyanate, cyanide, azide, and the like.

When a solution of phosphorus sesquisulfide is employed in the process it can be utilized as a vapor, or liquid or may be dissolved in a solvent. Suitable solvents or diluents for the phosphorus sesquisulfide are solvents that dissolve the phosphorus sesquisulfide and which preferably swell the surface of the substrate without detrimentally affecting it. Such solvents include the halogenated hydrocarbons and halocarbons such as chloroform, methyl chloroform, phenyl chloroform, dichloroethylene, trichloroethylene, perchloroethylene, trichloroethane, dichloropropane, ethyl dibromide, ethyl chlorobromide, propylene dibromide, monochlorobenzene, monochlorotoluene and the like; aromatic hydrocarbons such as benzene, toluene, xylene, ethyl benzene, naphthalene and the like; ketones such as acetone, methyl ethyl ketone, and the like; acetic acid; acetic acid-trichloroethylene mixtures; carbon disulfide; and the like.

When a solution of phosphorus sesquisulfide is employed in the process, the solution concentration is generally in the range from about 0.0001 weight percent of phosphorus sesquisulfide based on the weight of the solution up to a saturated solution, and preferably from about 0.5 to about 2.5 percent. Prior to contacting the substrate with the phosphorus sesquisulfide, liquid or solution, the surface of the substrate should be clean. When a solution is used, the solvent generally serves to clean the surface. A solvent wash may be desireable when liquid phosphorus sesquisulfide is employed. The phosphorus sesquisulfide treatment is generally conducted at a temperature below the softening point of the substrate, and below the boiling point of the solvent, if the solvent is used. Generally, the temperature is in the range of about 0° to 135° centigrade, but preferably in the range of about 15° to 75° centigrade. The contact time varies depending on the nature of the substrate, the solvent and temperature, but is generally in the range of about 1 second to 1 hour or more, preferably in the range of about 1 to 20 minutes. The foregoing conditions described with respect to phosphorus sesquisulfide, generally also apply for the other phosphonic compounds.

The substrate can, if desired, be subjected to the solvent prior to subjection to the phosphorus or low oxidation state phosphorus compound in order to improve the quality of the resulting metal coating. It has been found that subjection of the substrate to the solvent hereinbefore disclosed prior to subjection to the phosphorus sesquisulfide has a very marked effect on the adhesion of the final metal plated article. The temperature of the solvent is directly related to the adhesion realized. Generally, the temperature is in the range of about 30° centigrade to the boiling point of the solvent, preferably about 50° to 100° and higher than the temperature of the solution of phosphorus or phosphorus compound, if a solution is used. The contact time varies depending on the nature of the substrate, solvent and temperature but preferably is 1 to 15 minutes.

As a result of treatment with phosphorus or low oxidation state phosphorus compounds, the phosphorus or low oxidation state phosphorus compounds are deposited at the surface of the substrate. By this is meant that they can be located on the surface, embedded in the surface and embedded beneath the surface of the substrate. The location of the elemental phosphorus or phosphorus compound is somewhat dependent on the action of the solvent on the surface if one is used.

Following the treatment with elemental phosphorus or low oxidation state phosphorus compound, the substrate can be rinsed with a solvent and can then be dried by merely exposing the substrate to the atmosphere or to inert atmospheres such as nitrogen, carbon dioxide, and the like, or by drying the surface with radiant heaters or in a conventional oven. Drying times can vary considerably, for example, from 1 second to 30 minutes or more, preferably 5 seconds to 10 minutes, and preferably 5 to 120 seconds. The rinsing and drying steps are optional.

The thus-treated substrate is thereafter subjected to a solution of a metal salt or a complex of a metal salt which is capable of reacting with the elemental phosphorus to form a metal phosphide, or capable of reacting with the low oxidation state phosphorus compound to form a metal-phosphorus coating. The term metal phosphide, as used herein means the metal-phosphorus coating which is formed at the surface of the substrate, the term metal-phosphorus coating means the coating which is formed at the surface of the substrate and the term metal-phosphorus-sulfur compound means the metal-phosphorus-sulfur coating which is found at the surface of the solution. The metals generally employed are those of Groups IB, IIB, IVB, VB, VIB, VIIB and VIII of the Periodic Table appearing on pages 60–61 of *Lange's Handbook of Chemistry* (revised 10th. Ed.). The preferred metals are copper, chromium, manganese, cobalt, nickel, titanium, zirconium, vanadium, tantalum, cadmium, tungsten, molybdenum, silver, zinc, and the like.

The metal salts that are used can contain a wide variety of anions. Suitable anions include the anions of mineral acids such as sulfate, chloride, nitrate, phosphate, chlorate, perchlorate, and the like. Also useful are the anions of organic acids such as formate, acetate, citrate, stearate, and the like. Generally, the anions of organic acids contain one to 18 carbon atoms. Some useful metal salts include copper sulfate, copper chloride, nickel sulfate, nickel chloride, and nickel cyanide.

The metal salts can be complexed with a complexing agent that produces a solution having a basic pH (>7). Particularly useful are the ammoniacal complexes of the metal salts in which one to six ammonia molecules are complexed with the foregoing metal salts. Typical examples include $NiSO_4 \cdot 6NH_3$, $NiCl_2 \cdot 6NH_3$, $Ni(C_2H_3OH)_2 \cdot 6NH_3$, $CuSO_4 \cdot 6NH_3$, $CuCl_2 \cdot 6NH_3$, $NiSO_4 \cdot 3NH_3$, $CuSO_4 \cdot 4NH_3$, and the like. Other useful complexing agents include quinoline, amines, and pyridine.

The foregoing metal salts and their complexes are used in ionic media, preferably in aqueous solutions. However, nonaqueous media can be employed such as alcohols, for example, methanol, ethanol, butanol, and the like. Mixtures of alcohol and water can be used and ionic mixtures of alcohol with other miscible solvents of the types disclosed hereinbefore are also useful. The solution concentration is generally in the range from about 0.1 weight percent metal salt or complex based on the total weight of the solution up to a saturated solution, preferably from about 1 to about 10 weight percent metal salt or complex. The pH of the metal salt or complex solution can range from about 4 to 14, but is generally maintained in the basic range, i.e., greater than 7, and preferably from about 10 to about 13. Generally, the contact temperature is in the range of about 0° to 110° centigrade, preferably from about 20° to 100° centigrade. The time of contact can vary considerably depending on the nature of the substrate, the characteristic of the metal salts employed and the contact temperature. However, the time of contact is generally in the range of about 0.1 to 30 minutes, preferably from about 5 to 10 minutes.

The siccative coating compositions used in the practice of this invention are often referred to as paint (oil and latex based), lacquers, varnishes, enamels and similar protective and decorative coatings. They are characterized by being comprised of a volatile or solvent portion and a nonvolatile or film forming portion. The volatile or solvent portion of the composition may be a conventional solvent such as toluene, xylene, mineral spirits, kerosene, alcohols, esters such as ethyl acetate or naphtha, or more desirably for elevated temperature applications, substantially non-flammable halogenated aliphatic hydrocarbon solvents. Examples of halogenated solvents include trichloroethylene, perchloroethylene, the trichloroethanes, tetrachloroethane, ethylene chloride, ethylene dichloride, ethylidene chloride, the dichlorotetrafluoroethanes, the trichlorotetrafluoroethanes, the trichlordifluoroethanes, the tetrachlorodifluoroethanes, the fluorotrichloroethanes, the fluorotetrachloroethanes, methyltrifluoroethylene, 1,2-dichloropropane, 1,2dichloropropene, 1,1,2-trichloropropane, ethyltrichloroethylene and mixtures thereof as well as other halogenated compounds similar in property to those recited above. As can be noted, these materials are often of about one to four carbon atoms and about one to six halogen atoms.

The nonvolatile or film forming portion of the siccative coating composition may be organic and/or inorganic. Normally, coating compositions such as paints, lacquers and varnishes conatin both organic and inorganic materials. The primary requirement of the coating composition is that it be compatible with the solvent used.

The particular film forming material used can be either the thermoplastic or thermosetting type. These include film forming vehicles hardened by mere evaporation of solvent, as well as those requiring a subsequent curing step to completely harden the vehicle. Most preferred vehicles are those which quickly assume a fixed adherent film after withdrawing from the coating composition. Such vehicles include varnishes, lacquers, enamels, alkyds, amino plastic resins, epoxy oils, epoxy resins, phenolic resins, phenolic modified resins, drying oils and the like, in addition to various modifications thereof.

The siccative coating compositions are generally maintained between about 20° and about 146° centigrade and can contain pigments and/or coloring agents, fillers and the like insoluble materials. Typical pigments and/or coloring agents conventionally employed in coating compositions are chrome yellow, chrome green, zinc yellow, molybdate orange, hansa yellow, the iron blues, the iron yellows, the iron reds, titamium dioxide, zinc oxide, toluidiene red, peacock blue, and the like. The coating compositions can be applied by roller coater, brush, spraying, dripping or other conventional means of application known in the art. Because the metal phosphorus and/or metal-phosphorus-sulfur compound is electrically conductive, the coating can be applied by electrophoretic means.

The following examples serve to illustrate the invention but are not intended to limit it. Unless otherwise specified, all temperatures are in degrees centigrade and all parts are understood and expressed in parts by weight.

EXAMPLE 1

A polypropylene sheet was immersed in a 2 percent solution of phosphorus in trichloroethylene at 60° C. for 3 minutes and then washed with a 60 percent solution of DMF in water at 50° C. for 30 seconds. The sheet was then placed in a two liter nickel bath which contained 1,950 cc. of 2% $NiCl_2$ in 23% $NH_4OH$ and 50 cc. of 20% NaOH. After 10 minutes, the sheet was withdrawn and was found to have obtained a highly conductive black nickel phosphide coating. The immersion in the nickel bath was done at room temperature.

EXAMPLE 2

An ABS plastic sample was treated as in Example 1 except that a 1 percent solution of phosphorus in a mixture of trichloroethylene and perchloroethylene was employed and the time of immersion in the phosphorus solution was 2 minutes. An excellent quality black coating was produced on the sample.

EXAMPLE 3

Specimens of polyethylene, polystyrene, polyvinylchloride and polymethylmethacrylate were treated with phosphorus vapor by suspending the plastic specimen for 1 hour in an atmosphere of phosphorus vapor maintained at 100° C. Subsequently, the phosphorus-treated plastic specimens were immersed for 10 minutes in a solution prepared by adding sufficient ammonium hydroxide to a silver nitrate solution to form the complex $AgNO_3 \cdot 6NH_3$. The treatment resulted in the formation of a silver phosphide deposit at the plastic surface.

EXAMPLE 4

A specimen of polyethylene was immersed in a solution of yellow phosphorus dissolved in trichloroethylene for 1 minute. The resulting phosphorus-treated polyethylene specimen was thereafter immersed in an aqueous solution of copper sulfate for several minutes. The treated polyethylene specimen was washed with water, wiped dry and then dried with hot air. The resulting film of copper phosphide was found to be conductive.

EXAMPLE 5

Samples of cardboard, cork, porous clay, and asbestos cement were subjected to a 2 percent solution of phosphorus in trichloroethylene at 60° C. and then to a 10 percent solution of nickel sulfate in excess ammonium hydroxide at 90° C. to form a nickel phosphide at the surface of the substrates.

EXAMPLE 6

A polypropylene panel was dipped in a 2 percent solution of phosphorus in trichloroethylene maintained at 65° C. for 2 minutes. Thereafter the panel was rinsed with water and dipped into a metal salt bath which contained 26.4 grams nickel sulfate hexahydrate, 116.8 grams triethylene tetramine, 20 grams sodium hydroxide and sufficient water to obtain 800 milliliters of solution and maintained at 90° C. After 10 minutes the panel was withdrawn and rinsed in water for 10 minutes. The polypropylene panel had a black, conductive nickel phosphide coating on the surface of the plastic. The thus treated panel was given a coat of siccative composition comprising 8.9 percent linseed oil, 9.4 percent tall oil alkyd resin, 25.9 percent mineral spirits and driers, 33.1 percent titanium-calcium, and 22.7 percent calcium carbonate, and allowed to air dry for 48 hours, followed by an additional 24 hours in a forced draft oven maintained at 50° C. The thus-produced coating was hard and could not be removed by the fingernail scratch test.

An untreated polypropylene panel was coated with the identical coating composition but no adhesion between the coating and the polypropylene panel was obtained.

EXAMPLE 7

A polyvinyl chloride panel was treated as in Example 6 to obtain a black, nickel phosphide adherently formed on its surface. The panel was then coated and dried as in Example 6 to form an adhesively bound coating on the nickel phosphide.

EXAMPLE 8

A polypropylene sample was treated as in Example 6 and then coated with an enamel composition comprising 0.5 percent titanium dioxide, 0.7 percent toner, 5.7 percent molydate orange, 0.5 percent ferric oxide, 3.6 percent calcium carbonate, 38.3 percent soya alkyd (non-volatile), and 50.7 percent mineral spirits. The coating was adherently bound to the phosphide.

EXAMPLE 9

A polypropylene sample was treated as in Example 6 and coated with Motofinish dark grey machinery lacquer, manufactured by the Corecto Company. The resulting coating was adherently bound to the metal phosphide.

EXAMPLE 10

Polypropylene and polyvinyl chloride panels were subjected for perchloroethylene at 65° C., then air dried for 1 minute. The treated panels were thereafter subjected for 10 minutes to 0.9 percent $P_4S_3$ in perchloroethylene at 35° C. The thus treated panels were air dried for 6 minutes and thereafter subjected for 15 minutes to a solution of 0.4M $CuCl_2$, 0.16M ethylene diamine, and 0.3M NaOH at 60° C. The thus treated panels were thereafter air dried for 1 minute, distilled water rinsed for 1 minute and oven dried for 30 minutes at 85° C. The thus treated panels were found conductive.

EXAMPLE 11

The polypropylene and polyvinyl chloride panels of Example 10 were coated in accordance with Example 9. The resulting coating was hard and could not be removed by the fingernail scratch test.

EXAMPLE 12

The polypropylene and polyvinyl chloride panels of Example 10 were coated with the siccative composition of Example 6. The resulting coating was hard and could not be removed by the fingernail scratch test.

EXAMPLE 13

The Polypropylene and polyvinyl chloride panels of Example 10 were coated with the enamel composition of Example 8. The resulting coating was hard and could not be removed by the fingernail scratch test.

Various changes and modifications can be made in the process and products of this invention without departing from the spirit and scope of the invention. Various embodiments of the invention disclosed herein serve to further illustrate the invention but are not intended to limit it.

I claim:
1. An article comprising a substrate, a metal phosphorus coating adherently bound to a surface of said substrate, and a cured siccative coating composition adherently bound to said metal phosphorus coating, said metal phosphorus coating comprising the reaction product of elemental phosphorus and a low oxidation state phosphorus compound and a metal salt or complex thereof, wherein said metal is selected from Groups IB, IIB, IVB, VB, VIB, VIIB and VIII of the Periodic Table.

2. An article comprising a substrate, a metal phosphide adherently bound to a surface of said substrate, and a cured siccative coating composition adherently bound to said metal phosphide, wherein said metal is selected from Groups IB, IIB, IVB, VB, VIB, VIIB and VIII of the Periodic Table.

3. The article of claim 2 wherein said siccative coating composition is paint.

4. The article of claim 2 wherein said siccative coating composition is lacquer.

5. The article of claim 2 wherein said siccative coating composition is enamel.

6. The article of claim 2 wherein said substrate is plastic and said metal is nickel.

7. The article of claim 6 wherein said plastic is polypropylene.

8. The article of claim 6 wherein said plastic is polyvinyl chloride.

9. An article comprising a substrate, a metal-phosphorus-sulfur compound adherently bound to a surface of said substrate, and a cured siccative coating composition adherently bound to said metal-phosphorus-sulfur compound, wherein said metal is selected from Groups IB, IIB, IVB, VB, VIB, VIIB and VIII of the Periodic Table.

10. The article of claim 9 wherein said siccative coating composition is paint.

11. The article of claim 9 wherein said siccative coating composition is lacquer.

12. The article of claim 9 wherein said siccative coating composition is enamel.

13. The article of claim 9 wherein said substrate is plastic and said metal is nickel.

14. The article of claim 13 wherein said plastic if polypropylene.

15. The article of claim 13 wherein said plastic is polyvinyl chloride.

* * * * *

UNITED STATES PATENT OFFICE
CERTIFICATE OF CORRECTION

PO-1050
(5/69)

Patent No. 3,650,807  Dated March 21, 1972

Inventor(s) Gilbert Witschard

It is certified that error appears in the above-identified patent and that said Letters Patent are hereby corrected as shown below:

In the Title, line 4 "Siccatine" should read ---Siccative---. Column 1, line 3, "Siccatine" should read ---Siccative---; line 54, "1070" should read ---1970---. Column 2, line 8 "epoxy**" should read ---epoxy---. Column 8, line 41 "if" should read ---is---.

Signed and sealed this 1st day of August 1972.

(SEAL)
Attest:

EDWARD M. FLETCHER, JR.
Attesting Officer

ROBERT GOTTSCHALK
Commissioner of Patents